(12) United States Patent
Yoshino et al.

(10) Patent No.: US 8,120,744 B2
(45) Date of Patent: Feb. 21, 2012

(54) LIQUID CRYSTAL CELL ASSEMBLY AND LIQUID CRYSTAL CELL MANUFACTURING METHOD

(75) Inventors: Masao Yoshino, Sagamihara (JP); Toshiharu Nishino, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 54 days.

(21) Appl. No.: 12/552,950

(22) Filed: Sep. 2, 2009

(65) Prior Publication Data
US 2009/0323006 A1 Dec. 31, 2009

Related U.S. Application Data

(63) Continuation of application No. 11/729,417, filed on Mar. 28, 2007, now Pat. No. 7,605,901.

(30) Foreign Application Priority Data

Mar. 30, 2006 (JP) ................................. 2006-094926

(51) Int. Cl.
*G02F 1/1339* (2006.01)
(52) U.S. Cl. .................... 349/153; 349/154; 349/190
(58) Field of Classification Search .................... 349/154
See application file for complete search history.

(56) References Cited

U.S. PATENT DOCUMENTS

| | | | |
|---|---|---|---|
| 5,929,959 A * | 7/1999 | Iida et al. | 349/154 |
| 5,963,281 A | 10/1999 | Koons et al. | |
| 6,099,672 A | 8/2000 | Yamazaki et al. | |
| 7,138,030 B2 | 11/2006 | Choo et al. | |
| 2002/0033926 A1 * | 3/2002 | Nakahara et al. | 349/154 |
| 2004/0239864 A1 * | 12/2004 | Asakawa | 349/153 |
| 2005/0185120 A1 | 8/2005 | Kitoh et al. | |
| 2007/0195256 A1 | 8/2007 | Lee et al. | |

FOREIGN PATENT DOCUMENTS

| | | |
|---|---|---|
| CN | 1658031 A | 8/2005 |
| JP | 11-44878 A | 2/1999 |
| JP | 2000-19536 A | 1/2000 |
| JP | 2002-296574 A | 10/2002 |
| JP | 2004-205729 A | 7/2004 |
| JP | 2004-212690 A | 7/2004 |

OTHER PUBLICATIONS

A Korean Office Action (and English translation thereof) dated Jan. 31, 2008, issued in a counterpart Korean Application.
Chinese Office Action (and English translation thereof) dated Sep. 19, 2008, issued in a counterpart Chinese Application.
Japanese Office Action dated Jul. 21, 2009 and English translation thereof issued in a counterpart Japanese Application No. 2006-094926.

* cited by examiner

*Primary Examiner* — Thanh-Nhan Nguyen
(74) *Attorney, Agent, or Firm* — Holtz, Holtz, Goodman & Chick, PC

(57) ABSTRACT

A liquid crystal cell assembly includes a first substrate member on which at least first electrodes are formed on each of cell regions which respectively correspond to liquid crystal cells and are arranged to be adjacent to each other, a second substrate member on which at least a second electrode opposing the first electrodes is formed on each cell region to correspond to each cell region of the first substrate member, and frame-like seal members which are arranged between the first substrate member and second substrate member, include common sides each formed by continuously connecting at least two adjacent side, are formed into frames that respectively define the cell regions, and bond the first and second substrate members.

7 Claims, 6 Drawing Sheets

LIQUID CRYSTAL CELL ASSEMBLY AND LIQUID CRYSTAL CELL MANUFACTURING METHOD

CROSS-REFERENCE TO RELATED APPLICATIONS

The present application is a Continuation Application of U.S. application Ser. No. 11/729,417 filed Mar. 28, 2007 now U.S. Pat. No. 7,605,901, which is based upon and claims the benefit of priority from prior Japanese Patent Application No. 2006-094926, filed Mar. 30, 2006, the entire contents of which are incorporated herein by reference.

BACKGROUND OF THE INVENTION

1. Field of the Invention

The present invention relates to a liquid crystal cell assembly to manufacture liquid crystal cells, and a liquid crystal cell manufacturing method.

2. Description of the Related Art

A liquid crystal cell used in a liquid crystal display apparatus includes first and second substrates which oppose each other via a gap and are bonded to each other through a frame-like seal member which surrounds a screen area with a predetermined area. Of the opposing inner surfaces of the first and second substrates, the inner surface of the first substrate is provided with first electrodes to correspond to the screen area. The inner surface of the second substrate is provided with at least one second electrode which forms pixels in a region opposing the first electrodes. A terminal array portion is formed on part of the peripheral portion of the first substrate to extend outwardly from the second substrate. The terminal array portion is provided with terminals electrically connecting to the first and second electrodes respectively.

The liquid crystal cell is manufactured by a method of assembling a liquid crystal cell assembly including arrayed liquid crystal cells and separating the liquid crystal cell assembly into liquid crystal cells. This manufacturing method manufactures liquid crystal cells at once (see Jpn. Pat. Appln. KOKAI Publication No. 2000-19536).

According to this manufacturing method, the first and second substrate members bonded to each other through frame-like seal members, thus assembling the liquid crystal cell assembly. The first substrate member includes arrayed first substrate regions. The second substrate member includes second substrate regions arrayed to correspond to the first substrate regions. Each of the first and second substrate members has an area that can provide liquid crystal cell substrates. The frame-like seal members surround a screen area in units of substrate regions.

The bonded body of the first and second substrate members is cut apart along segmentation lines of the first and second substrate regions. This separates the liquid crystal cell assembly into the liquid crystal cells.

In the conventional liquid crystal cell manufacturing method, the first substrate member is defined into the first substrate regions each of which has a shape larger than the outer shape of the corresponding frame-like seal member that surround the screen area. The second substrate member is defined into the second substrate regions the entire shape of each of which is larger than the outer shape of the corresponding frame-like seal member. Hence, each of the first and second substrates can provide only a small number of substrates, leading to poor productivity of liquid crystal cells.

BRIEF SUMMARY OF THE INVENTION

A liquid crystal cell assembly according to one aspect of the present invention includes a first substrate member on which at least first electrodes are formed on each of cell regions which respectively correspond to liquid crystal cells and are arranged to be adjacent to each other, a second substrate member on which at least a second electrode opposing the first electrodes is formed on each cell region to correspond to each cell region of the first substrate member, and frame-like seal members which are arranged between the first and second substrate members, include common sides each formed by continuously linking at least two adjacent sides, are formed into frames that respectively define the cell regions, and bond the first and second substrate members.

A liquid crystal cell manufacturing method according to another aspect of the present invention includes a first step of forming a first substrate member on which at least first electrodes are respectively formed on cell regions which respectively correspond to liquid crystal cells and are arranged to be adjacent to each other, a second step of forming a second substrate member on which at least a second electrode opposing the first electrodes is formed on each of the cell regions of the first substrate member, a third step of forming frame-like seal members on at least one of the surface of the first substrate member where the first electrodes are formed and the surface of the second substrate member where the second electrode is formed, which define the surface into the cell regions, such that the frame-like seal members are continuous through common sides each of which is formed by linking at least one side of each of the adjacent cell regions, a fourth step of forming a cell assembly by adhering the first and second substrate members such that surfaces of the first and second substrate members where the respective electrodes are formed oppose each other, and a fifth step of separating the cell assembly into individual liquid crystal cells by segmenting the first substrate member, the second substrate member, and the seal members for the respective cell regions along perimeters of the cell regions defined by the seal members and along a segmentation line provided on the frame-like seal members which form the common sides of the adjacent cell regions.

A liquid crystal cell manufacturing method according to still another aspect of the present invention includes a first step of forming first electrodes which define a screen area which displays an image of one liquid crystal cell, and terminal electrodes to form a terminal array portion where terminals respectively connecting to the first electrodes are arranged continuously in two perpendicular directions, for respective first substrate regions each of which corresponds to one liquid crystal cell, on a plate surface of a first substrate member including an area that provides liquid crystal cell substrates, a second step of forming a second electrode, which opposes the first electrodes formed on the first substrate member, for respective second substrate regions each of which corresponds to one liquid crystal cell, the second electrode being arranged on a plate surface of a second substrate member including an area that provides liquid crystal cell substrates so as to correspond to the screen area of the first substrate regions, a third step of forming a frame-like seal member, on at least one of the first and second substrate members, into a shape which includes a common side formed to stride across a boundary of adjacent substrate regions on one of the first substrate regions and the second substrate regions, and remaining sides that surround the screen area, the seal member being continuous across the substrate regions, a fourth step of arranging the first and second substrate members such that the second substrate regions oppose the screen area of the first substrate regions, and bonding the first and second substrate members through the frame-like seal member, and a fifth step of segmenting the first and second substrate members that are bonded, along segmentation lines on boundaries of the first substrate regions and the second substrate regions simultaneously with the common side which is formed to stride across the boundary of the adjacent substrate regions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 7A to 7C respectively show the segmentation processes of the liquid crystal cell assembly, in which FIG. 7A shows the step of scribing the first substrate member, FIG. 7B shows the step of scribing a second substrate member, and FIG. 7C shows the step of segmenting the liquid crystal cell assembly;

DETAILED DESCRIPTION OF THE INVENTION

Figure 1:
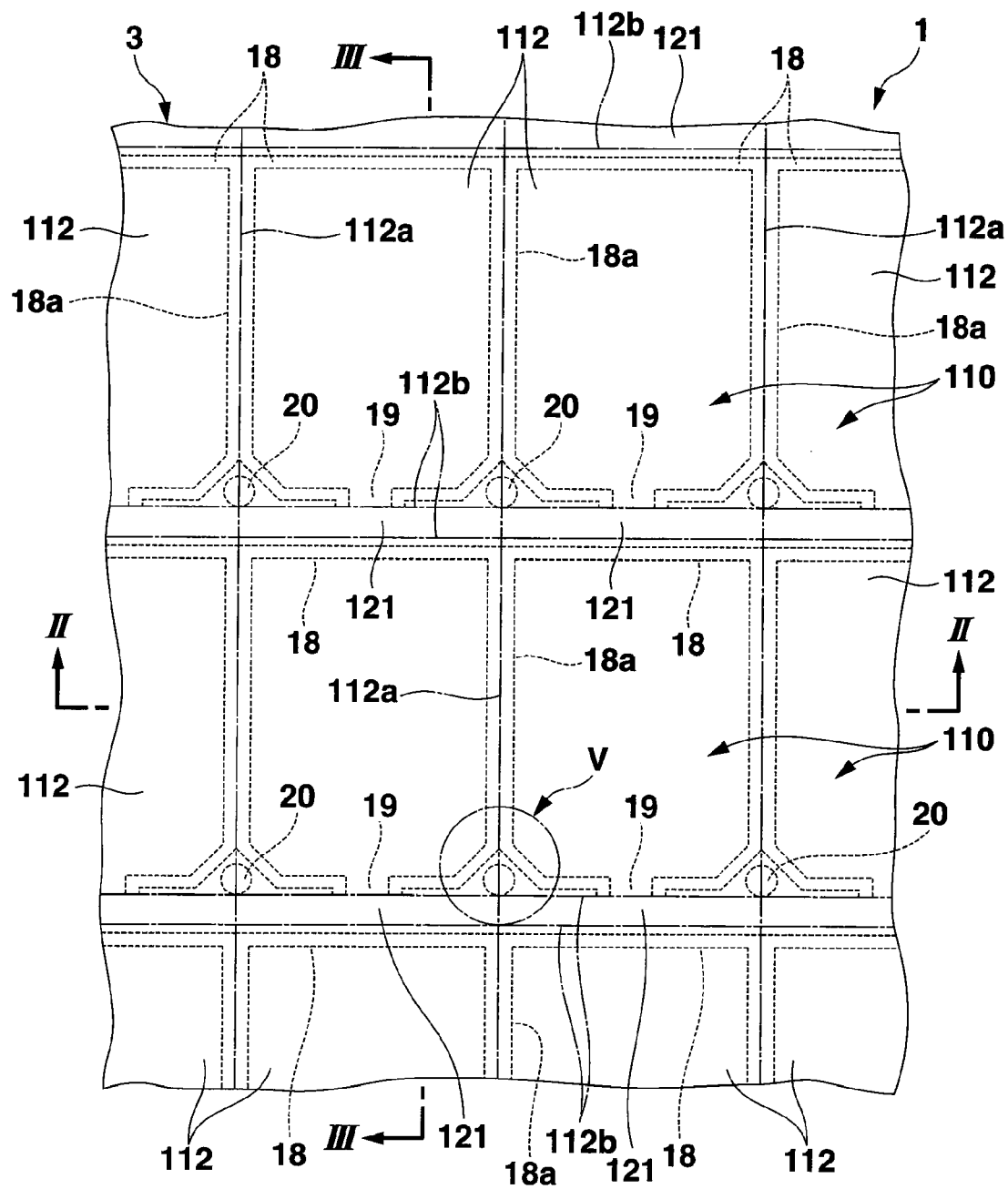
FIG. 1 is a plan view of part of a liquid crystal cell assembly according to the first embodiment of the present invention.
Figure 2:
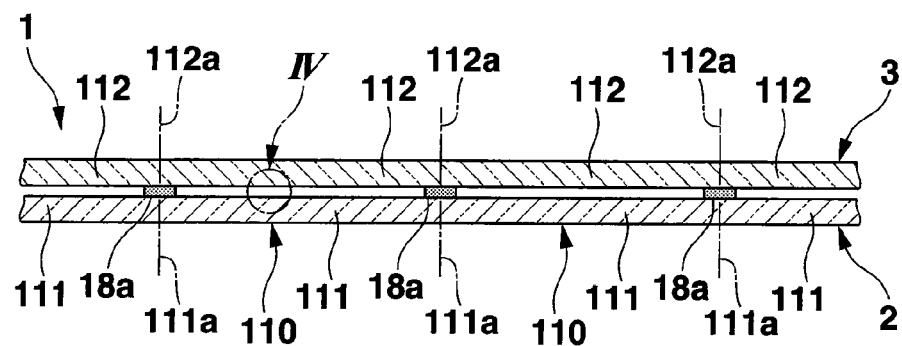
FIG. 2 is a sectional view of the liquid crystal cell assembly taken along the line II-II of FIG. 1.
Figure 3:
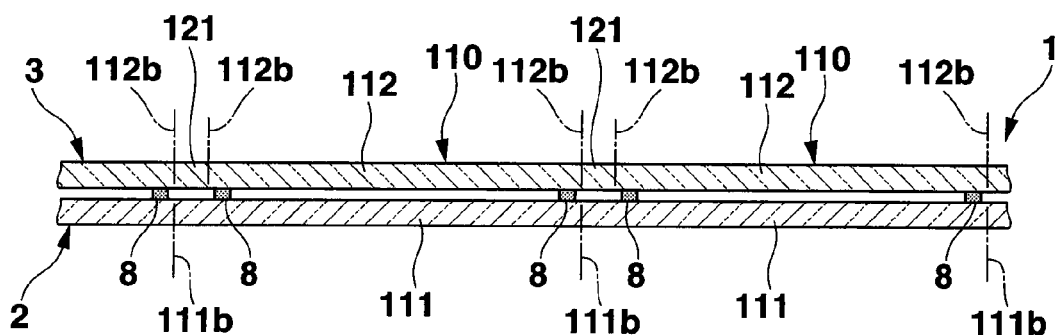
FIG. 3 is a sectional view of the liquid crystal cell assembly taken along the line III-III of FIG. 1.
Figure 4:
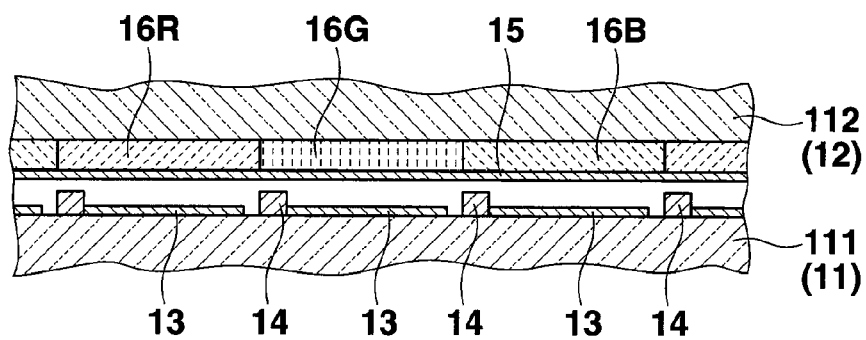
FIG. 4 is an enlarged view of a portion IV in FIG. 2.
Figure 5:
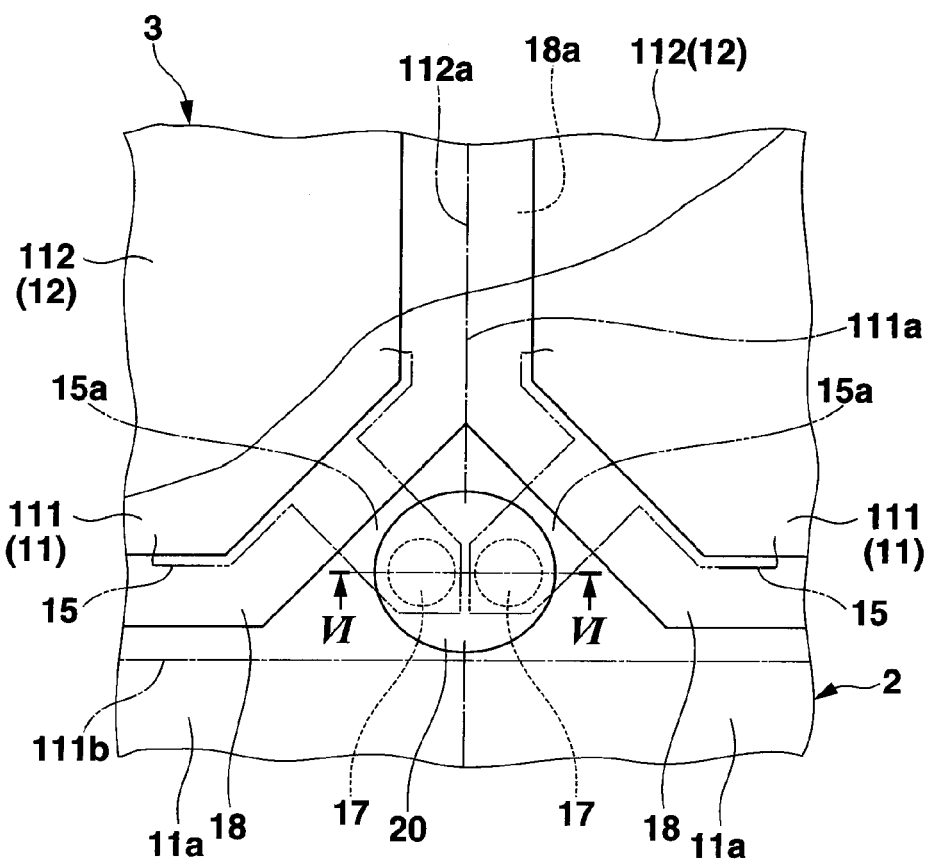
FIG. 5 is an enlarged view of a portion V in FIG. 1.
Figure 6:
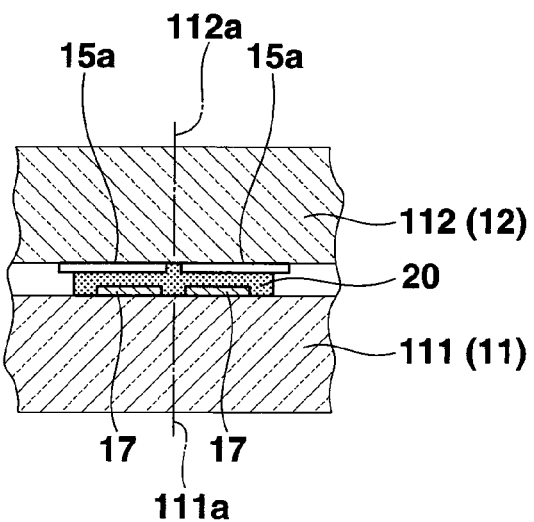
FIG. 6 is a sectional view of the liquid crystal cell assembly taken along the line VI-VI of FIG. 5.

FIGS. 1 to 8 show the first embodiment of the present invention, in which FIG. 1 is a plan view of part of a finished liquid crystal cell assembly, FIGS. 2 and 3 are sectional views of the liquid crystal cell assembly taken along the lines II-II and III-III, respectively, of FIG. 1, FIG. 4 is an enlarged view of a portion IV in FIG. 2, FIG. 5 is an enlarged view of a portion V in FIG. 1, and FIG. 6 is a sectional view of the liquid crystal cell assembly taken along the line VI-VI of FIG. 5.

Figure 8A:
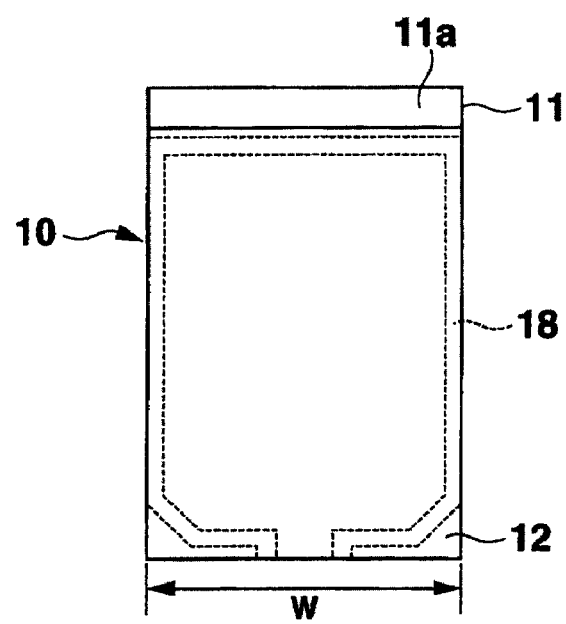
FIG. 8A is a plan view of a liquid crystal cell manufactured by a manufacturing method according to an embodiment of the present invention.

First, one liquid crystal cell 10 to be manufactured will be described. In the liquid crystal cell 10, as shown in FIG. 8A, a first substrate 11 and a second substrate 12 oppose each other via a gap and are bonded to each other through a frame-like seal member 18 which surrounds a screen area having a predetermined area.

The first and second substrates 11 and 12 have opposing inner surfaces. The inner surface of the first substrate 11 is provided with transparent first electrodes 13 to correspond to the screen area. The inner surface of the second substrate 12 is provided with at least one transparent second electrode 15 to oppose the first electrodes 13. The opposing regions of the second electrode 15 and first electrodes 13 define respective pixels. Alignment films (not shown) are formed on those regions of the inner surfaces of the respective first and second substrates 11 and 12 which correspond to the screen area, to cover the electrodes 13 and 15.

A terminal array portion 11a (see FIG. 8A) is formed on part of the peripheral portion of the first substrate 11 to extend outwardly from the second substrate 12. The terminal array portion 11a is provided with terminals (not shown) electrically connected to the first electrodes 13 and second electrode 15, respectively.

In the liquid crystal cell 10, the inner surface of the first substrate 11 is provided with the first electrodes 13 (to be referred to as pixel electrodes 13 hereinafter) arranged in row and column directions to form a matrix to correspond to the screen area, TFTs (Thin Film Transistors) 14 respectively corresponding to the pixel electrodes 13, scanning lines (not shown) which supply gate signals to the TFTs 14 of each row, and signal lines (not shown) which supply data signals to the TFTs 14 of each column. The inner surface of the second substrate 12 is provided with the second electrode 15 (to be referred to as the counterelectrode 15 hereinafter), which forms one film and opposes the pixel electrodes 13, on the entire range of the screen area. These elements constitute an active matrix liquid crystal cell.

As shown in FIG. 4, the liquid crystal cell 10 comprises red, green, and blue color filters 16R, 16G, and 16B on the inner surface of the second substrate 12 which respectively correspond to the pixels in the screen area surrounded by the frame-like seal member 18. The color filters 16R, 16G, and 16B are formed on the substrate surface of the second substrate 12, and the counterelectrode 15 is formed to cover the color filters 16R, 16G, and 16B.

Although simplified in FIG. 4, each TFT 14 comprises a gate electrode formed on the substrate surface of the first substrate 11, a transparent gate insulating film formed almost on the entire substrate surface to cover the gate electrode of each TFT 14, an i-type semiconductor film formed on the gate insulating film to oppose the gate electrode, a source electrode and drain electrode which are formed on two side portions of the i-type semiconductor film, that sandwich a channel region, through n-type semiconductor films, respectively, and an overcoat insulating film which covers these components.

The scanning lines are formed on the substrate surface to be integral with the gate electrodes of the TFTs 14 of the corresponding row. The signal lines are formed on the gate insulating film to be integral with the drain electrodes of the TFTs 14 of the corresponding column. The pixel electrodes 13 are formed on the gate insulating film and connect to the source electrodes of the corresponding TFTs 14 each at its one corner.

As shown in FIG. 8A, the first substrate 11 has the terminal array portion 11a on its one edge, e.g., the edge on its one end side in the column direction. Signal line terminals and scanning line terminals (neither are shown) are formed on the terminal array portion 11a.

The signal lines extend to the terminal array portion 11a and are connected to the signal line terminals. The scanning lines detour outside the array region of the pixel electrodes 13, extend to the terminal array portion 11a, and are connected to the scanning line terminals.

As shown in FIGS. 5 and 6, cross connecting portions 15a extending from the counterelectrodes 15 are formed at predetermined portions of the peripheral portion of the inner surface of the second substrate 12, e.g., at the corners at the two ends of an edge opposite to the terminal array portion 11a of the first substrate 11. The first substrate 11 is provided with cross electrodes 17 at portions of its edge which correspond to the cross connecting portions 15a. The cross electrodes 17 are connected to counterelectrode terminals (not shown) formed on the terminal array portion 11a through lead wires (not shown).

The frame-like seal member 18 has a shape obtained by forming an inward notch at one corner of a rectangle extending along the perimeter of the second substrate 12. The cross electrodes 17 are formed in the notches outside the frame-like seal member 18. Outside the frame-like seal member 18, the cross connecting portions 15a of the counterelectrodes 15 are connected to the cross electrodes 17 through a conductive cross member 20 made of a resin mixed with conductive particles.

The frame-like seal member 18 is also provided with a liquid crystal filling hole 19 on a side of the first substrate 11 which is opposite to the terminal array portion 11a. The liquid crystal filling hole 19 is formed by partially dropping the opposite side.

The liquid crystal cells 10 constitute a liquid crystal cell assembly 1, as shown in FIGS. 1 to 6. The liquid crystal cells 10 are manufactured by separating the liquid crystal cell assembly 1 into liquid crystal cells. The liquid crystal cell assembly 1 is assembled by bonding first and second substrate members 2 and 3, each having an area that provide the liquid crystal cells 10, through the frame-like seal members 18 for respective cell regions 110 which correspond to the liquid crystal cells 10. The liquid crystal cell assembly 1 includes the cell regions 110, which are arrayed in two perpendicular directions and in tight contact with each other at two side ends excluding the sides where the liquid crystal filling hole 19 and terminal array portion 11a are formed.

Each of the first and second substrate members 2 and 3 is formed of a thick glass plate having a thickness of 0.5 mm to 0.9 mm, and preferably approximately 0.7 mm.

The first substrate member 2 is provided with first substrate regions 111, consecutively arrayed in two perpendicular directions on a plate surface which opposes the second substrate member 3, to correspond to the first substrates 11 where the terminal array portions 11a of the liquid crystal cells 10 are formed. The pixel electrodes 13, the TFTs 14, the scanning lines, the signal lines, and an alignment film are formed on each first substrate region 111 to correspond to the screen area. The signal line terminals connected to the scanning lines, the scanning line terminals connected to the scanning lines, and the counterelectrode terminals connected to the cross electrodes 17 are formed on the terminal array portion 11a.

The second substrate member 3 is provided with second substrate regions 112 and strip-off portions 121 on a plate surface which opposes the first substrate member 2, to correspond to the liquid crystal cells 10 of the second substrate. The second substrate regions 112 corresponds to that region of the first substrate region 111 which excludes the terminal array portion 11a. The strip-off portion 121 corresponds to the terminal array portions 11a of the first substrates 11. The red, green, and blue color filters 16R, 16G, and 16B corresponding to the pixels, and the counterelectrode 15 and the alignment film to cover the color filters 16R, 16G, and 16B, are formed on each second substrate region 112.

The first substrate member 2 and second substrate member 3 are bonded to each other via a predetermined gap through the frame-like seal members 18 which correspond to the respective liquid crystal cells 10. Each frame-like seal member 18 surrounds the individual cell region 110. The two sides of the frame-like seal member 18 excluding the side where the liquid crystal filling hole 19 is formed and the side which corresponds to the terminal array portion 11a are in tight contact with those of the adjacent frame-like seal member 18. More specifically, those sides of each frame-like seal member 18 which correspond to the sides of the individual liquid crystal cell 10 have widths larger than those of the remaining sides. The frame-like seal members 18 corresponding to the adjacent cell regions 110 form a continuous shape with no gap between their sides.

Referring to FIGS. 1 to 3, 5, and 6, one-dot dashed lines 111a and 111b are segmentation lines which correspond to the boundaries of the first substrate regions 111 of the first substrate member 2 which are adjacent in two perpendicular directions, and serve to separate the first substrate regions 111 into the individual liquid crystal cells 10. One-dot dashed lines 112a are segmentation lines which correspond to the boundaries of the second substrate regions 112 of the second substrate member 3, which are directly adjacent to each other, and serve to separate the second substrate regions 112 into the individual liquid crystal cells 10. One-dot dashed lines 112b represent segmentation lines which correspond to the boundaries of the second substrate regions 112 of the second substrate member 3 and the strip-off regions 21, and serve to separate the second substrate regions 112 into the individual liquid crystal cells 10.

The second substrate regions 112 of the second substrate member 3 are provided with the cross connecting portions 15a extending from the counterelectrodes 15. The cross connecting portions 15a are formed at the notched portions of each frame-like seal member 18. The cell regions 110 corresponding to the respective liquid crystal cells 10 are adjacent to each other at the cross connecting portions 15a through the segmentation lines 112a of the segmentation edges which correspond to the side end edges of the directly adjacent cell regions 110.

The first substrate regions 111 of the first substrate member 2 are provided with the cross electrodes 17. The cross electrodes 17 are connected to the counterelectrode terminals formed on the terminal array portion 11a of the first substrate regions 111 through lead wiring lines. The cross electrodes 17 are formed at portions of the edges of the first substrate regions 111 which correspond to the cross connecting portions 15a.

The frame-like seal members 18 are formed on one of the first and second substrate members 2 and 3, e.g., the second substrate member 3, by screen printing or coating using a dispenser. The frame-like seal members 18 surround the screen area to correspond to the peripheral portions of the second substrate regions 112. Of the respective sides of the frame-like seal members 18, those sides of the second substrate regions 112 which are directly adjacent to each other share a common side 18a having a width equal to the sum of the two edges across the segmentation line 112a. Those portions of the frame-like seal member 18 which correspond to the cross electrodes 17 are located on the more inner side of the second substrate regions 112 than the cross electrodes 17.

The outer ends of the wall portion of the liquid crystal filling hole 19 coincide with the segmentation line 112b, or slightly project toward the strip-off portion 121 beyond the segmentation line 112b.

According to this embodiment, the cross connecting portions 15a of the counterelectrodes 15 and the cross electrodes 17 are formed at portions of the first and second substrate regions 111 and 112 which correspond to the corners at the two ends of the edge which are opposite to the terminal array portion 11a. The frame-like seal member 18 is obliquely chamfered at its portions corresponding to the corners.

The frame-like seal members 18 have thicknesses of, e.g., 0.003 mm to 0.007 mm in accordance with the substrate gap of the screen area of the liquid crystal cell 10 to be manufactured, i.e., the gap between the pixel electrodes 13 and counterelectrode 15.

Of the respective sides of each frame-like seal member 18, two sides other than the common sides 18a have widths of 0.6 mm to 0.8 mm, and the common sides 18a have widths of 1.2 mm to 1.6 mm, which is twice the width of each of the above two sides.

Furthermore, the conductive cross members 20 are formed on the substrate member on which the frame-like seal members 18 are formed, e.g., on the second substrate member 3, to correspond to the cross connecting portions 15a which are adjacent to each other through the segmentation line 112a. Each conductive cross member 20 serves to connect the cross connecting portions 15a of the counterelectrodes 15 to the cross electrodes 17, and strides across the two cross connecting portions 15a. The conductive cross member 20 is formed by screen printing or coating using a dispenser to have a thickness almost equal to that of the frame-like seal members 18.

The first and second substrate members 2 and 3 are bonded to each other through the frame-like seal members 18 such that the second substrate regions 112 of the second substrate member 3 oppose the regions of the first substrate member 2 which are other than the terminal array portions 11a of the first substrate regions 111. The conductive cross members 20 connect the cross connecting portions 15a of the counterelectrodes 15 to the cross electrodes 17.

The liquid crystal cell 10 is manufactured by the first step of forming necessary members, e.g., the pixel electrodes 13, on each first substrate region 111 of the plate surface of the first substrate member 2 which corresponds to the liquid crystal cells, the second of step of forming necessary members, e.g., the counterelectrode 15, for each second substrate region 112 of the plate surface of the second substrate member 3, the third step of applying the frame-like seal members 18 and conductive cross member 20 to at least one of the first substrate member 2 and second substrate member 3, the fourth step of bonding the first substrate member 2 and second substrate member 3 through the frame-like seal members 18 or the like to form a liquid crystal cell assembly, and the fifth step of segmenting the liquid crystal cell assembly 1 along the segmentation lines.

In the first step, the plate surface of the first substrate member 2 is defined into the first substrate regions 111. The pixel electrodes 13, TFTs 14, scanning lines, signal lines, alignment film, terminals, and cross electrodes 17 are formed on each first substrate region 111.

In the second step, the plate surface of the second substrate member 3 is defined into the second substrate regions 112 and strip-off portions 121. The red, green, and blue color filters 16R, 16G, and 16B, the counterelectrode 15, and the cross connecting portion 15a of the counterelectrode 15 are formed for each second substrate region 112.

In the third step, the frame-like seal members 18 are applied to at least one of the first substrate member 2 and second substrate member 3 to surround the screen area in correspondence with the peripheral portions of the second substrate regions 112. At the same time, of the respective sides of the frame-like seal members 18, the sides of the directly adjacent second substrate regions 112 comprise the common sides 18a each having a width to stride across the segmentation line 112a. Also, the conductive cross members 20 striding across the cross connecting portions 15a and cross electrodes 17 are formed each on that portion of at least one of the first substrate member 2 and second substrate member 3 which corresponds to the cross connecting portions 15a of the counterelectrodes 15, which are adjacent through the segmentation line 112a, and the cross electrodes 17.

In the fourth step, the first substrate member 2 and second substrate member 3 are adhered to each other such that those regions of the first substrates 11 which are other than the terminal array portions 11a and the second substrate 12 oppose each other. The first substrate member 2 and the second substrate member 3 are bonded to each other through the frame-like seal members 18 and conductive cross members 20, thus forming the liquid crystal cell assembly 1.

In the fifth step, the first and second substrate members 2 and 3 of the liquid crystal cell assembly 1 are cut apart along the segmentation lines 111a, 111b, 112a, and 112b of the first substrate regions 111, second substrate regions 112, and strip-off portions 121. At the same time, each common side 18a of the frame-like seal member 18 is segmented into a portion on one substrate region side and a portion on the other substrate region side, which are adjacent along the segmentation line, to separate the liquid crystal cell assembly 1 into the liquid crystal cells 10. The first to fourth steps manufacture the liquid crystal cells at once.

Figure 7A:
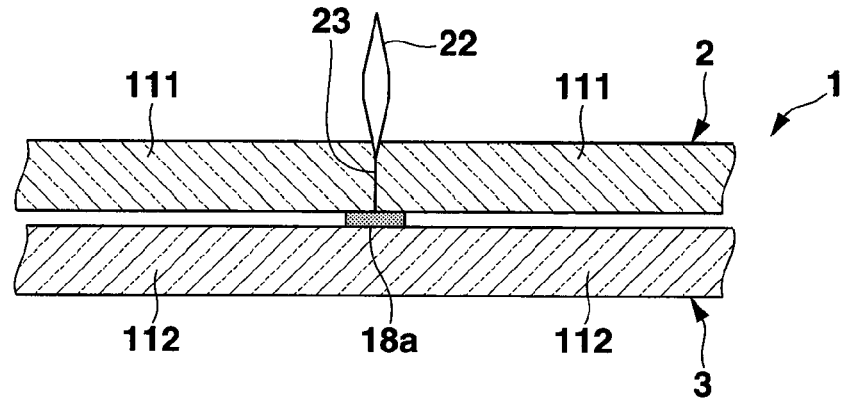
Figure 7B:
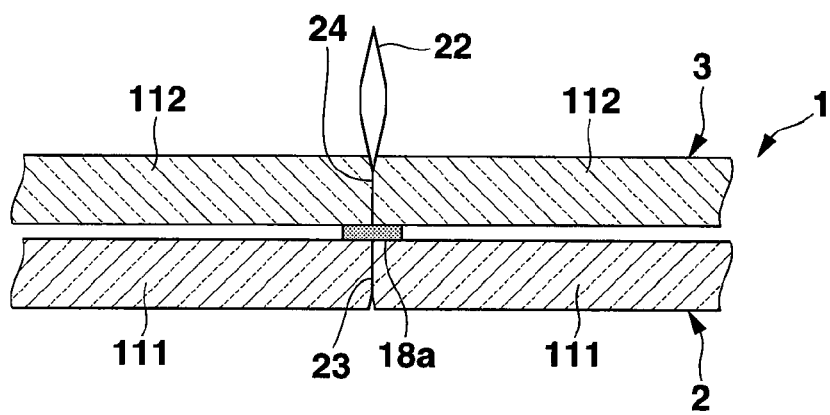
Figure 7C:
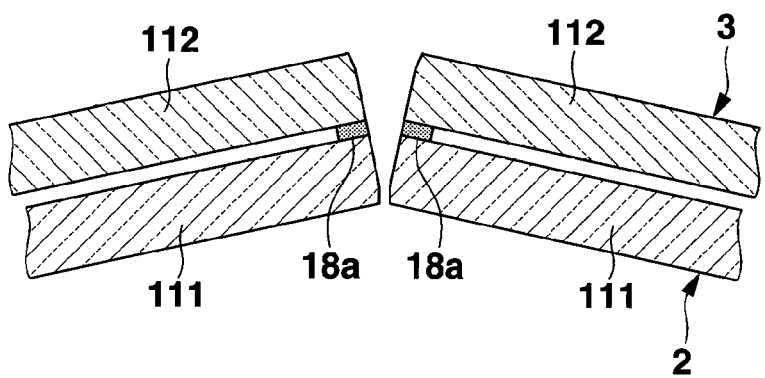

FIGS. 7A, 7B, and 7C show a method of separating the liquid crystal cell assembly 1. The liquid crystal cell assembly 1 is separated into the liquid crystal cells 10 in the following manner.

First, as shown in FIG. 7A, a cutter wheel 22 scribes the outer surface of the first substrate member 2 along the segmentation lines 111a of the first substrate regions 111. The stress of this scribing forms a crack 23 in the first substrate member 2 along the segmentation lines 111a and 111b.

Subsequently, as shown in FIG. 7B, the cutter wheel 22 scribes the outer surface of the second substrate member 3 along strip-off portions 121 and the segmentation lines 112a and 112b of the second substrate regions 112. The stress of this scribing forms a crack 24 in the second substrate member 3 along the segmentation lines 112a and 112b.

The outer surface of the first substrate member 2 and the outer surface of the second substrate member 3 may be scribed in the reverse order. The same cutter wheel 22 or different cutter wheels 22 may be employed to scribe the outer surfaces of the first and second substrate members 2 and 3.

As shown in FIG. 7C, a bending force is applied to the liquid crystal cell assembly 1 to cut apart the first substrate member 2 into the first substrate regions 111 and the second substrate member 3 into the second substrate regions 112 and strip-off portions 121 along the cracks 23 and 24. At the same time, cracks form in the common sides 18a of the frame-like seal members 18 along the segmentation lines 111a to segment the frame-like seal members 18 into frame-like seal members that constitute the respective liquid crystal cells. Similarly, cracks also form in the conductive cross members 20 along the segmentation lines 111a and 112a to segment the conductive cross members 20 into cross members that constitute the respective liquid crystal cells.

In the separation of the liquid crystal cell assembly 1, each of the first and second substrate members 2 and 3 is formed of a glass plate having a thickness of 0.5 mm to 0.9 mm, as described above. Thus, the stress of scribing along the segmentation lines 111a forms the cracks 23 and 24 in the portions of the common sides 18a of the frame-like seal members 18 of the substrate members 2 and 3 throughout almost the entire thicknesses of the substrate members 2 and 3. The bending force cuts apart the substrate members 2 and 3 at the cracks 23 and 24.

According to this manufacturing method, the liquid crystal cell assembly 1 is formed by bonding the first substrate member 2 and second substrate member 3 through the frame-like seal members 18 which surround the screen area of the substrate regions 112 to correspond to the peripheral portions of the second substrate regions 112 of the second substrate member 3. At the same time, of the respective sides of the frame-like seam members 18, the adjacent sides comprise the common sides 18a each having a width of the sum of the two sides to stride across the segmentation line 112a. After that, the bonded body of the first and second substrate members 2 and 3 is cut apart along the segmentation lines 111a, 111b, 112a, and 112b of the first substrate regions 111, second substrate regions 112, and strip-off portions 121. This segments the common sides 18a of the frame-like seal members 18 along the segmentation lines 111a and 111b. In the liquid crystal cell assembly 1, the first and second substrate regions 111 and 112 are arranged close to each other with no gap in between. This increases the number of substrates that each of the first and second substrate members 2 and 3 provides, to improve the productivity of the liquid crystal cells 10.

Figure 8B:
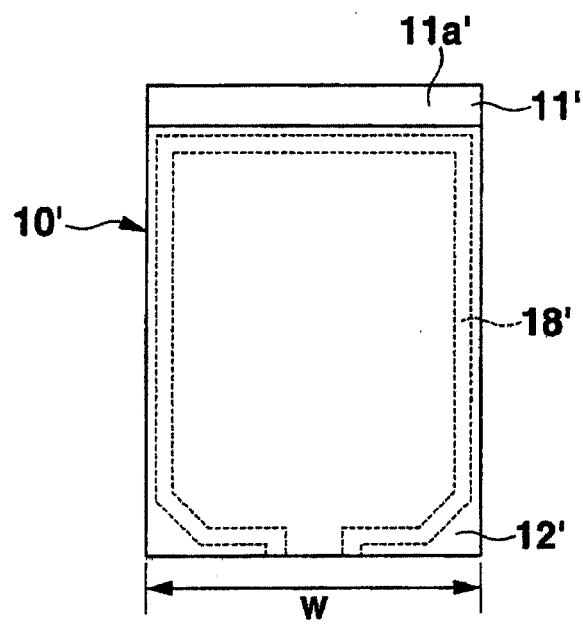
FIG. 8B is a plan view of a liquid crystal cell manufactured by a conventional manufacturing method.

FIG. 8A shows the liquid crystal cell 10 manufactured by the manufacturing method of the above embodiment, and FIG. 8B shows a liquid crystal cell 10' manufactured by a conventional manufacturing method.

As shown in FIG. 8B, in the liquid crystal cell 10' manufactured by the conventional manufacturing method, of the respective edges of a first substrate 11' (the first substrate region of the first substrate member) and a second substrate 12' (the second substrate region of the second substrate member), the two edges that oppose each other through a terminal array portion 11a' protrude outwardly from a frame-like seal member 18'.

In contrast to this, in the liquid crystal cell 10 manufactured by the manufacturing method of the above embodiment, as shown in FIG. 8A, of the respective edges of the first substrate 11 (the first substrate region of the first substrate member 2) and the second substrate 12 (the second substrate region of the second substrate member 3), the two edges the oppose each other through the terminal array portion 11a coincide with the outer edge of the frame-like seal member 18.

More specifically, in the liquid crystal cell 10 manufactured by the manufacturing method of the above embodiment, a width W of each of the first and second substrates 11 and 12 in the direction where the terminal array portion 11a does not exist is smaller than that in the liquid crystal cell 101 of the same screen size which is manufactured by the conventional manufacturing method.

Therefore, according to the manufacturing method of the above embodiment, the number of substrates that each of the first and second substrate members 2 and 3 provides increases, and the productivity of the liquid crystal cell 10 improves.

In addition, in the manufacturing method of the above embodiment, of the respective sides of the frame-like seal members, the sides that are directly adjacent to each other without intervening the strip-off portions 121 of the second substrate member 3 form the common sides 18a each having a width including both edges of the second substrate regions 112 which are adjacent across the segmentation line 112a. Hence, when forming the frame-like seal members 18 by screen printing, the printing pattern becomes simple. When forming the frame-like seal members 18 by coating using a dispenser, the control operation of moving the dispenser to the seal member coating pattern becomes simple. Thus, formation of the frame-like seal members 18 becomes easy, and the productivity of the liquid crystal cells improves. This reduces the manufacturing cost.

Furthermore, according to this manufacturing method, of the peripheral portions of the second substrate regions 112 of the second substrate member 3, portions that are adjacent through the segmentation lines 112a at edges directly adjacent without intervening the strip-off portions 121 are respectively provided with the cross connecting portions 15a extending from the counterelectrodes 15. Those portions at the edges of the first substrate member 2 which correspond to the cross connecting portions 15a of the first substrate regions 111 are respectively provided with the cross electrodes 17 connecting to the terminals formed on the terminal array portions 11a of the first substrate regions 111. Each conductive cross member 20 is formed to correspond to the cross connecting portions 15a adjacent through the segmentation line 112a such that the conductive cross member 20 strides across the both cross connecting portions 15a. When separating the liquid crystal cell assembly 1, the conductive cross member 20 is segmented along the segmentation lines 111a and 112a. Hence, when forming the conductive cross member 20 by screen printing, the printing pattern becomes simple. When forming the conductive cross members 20 by coating using the dispenser, the number of times of the operation of the dispenser to move to a target coating position and discharge the cross member material can be decreased to almost ½. This reduces the number of coating steps of the conductive cross members 20.

In the liquid crystal cell assembly 1, the first substrate member 2 and second substrate member 3 are bonded to each other through the frame-like seal members 18 which surround the screen area to correspond to the peripheral portions of the second substrate regions 112 of the second substrate member 3. Of the respective sides of the frame-like seal members 18, the adjacent sides comprise the common sides 18a each having a width that includes the both edges of the second substrate regions 112 which are adjacent across the segmentation line 112a. Those portions of each frame-like seal member 18 which correspond to the cross electrodes 17 are located on the more inner side of the substrate region than the cross electrodes 17.

The cross connecting portions 15a extending from the counterelectrodes 15 formed for each second substrate region 112 of the second substrate member 3 are formed at those portions of the second substrate regions 112 which are adjacent to each other through the segmentation lines 112a. Each conductive cross member 20 which connects to the cross electrodes 17 connecting to the terminals formed on the terminal array portion 11a is connected to the both cross connecting portions 15a that are adjacent across the segmentation line 112a. Hence, the number of substrates that each of the first and second substrate members 2 and 3 provides increases, and the productivity of the liquid crystal cells 10 improves. Also, in this liquid crystal cell assembly 1, the steps of forming the frame-like seal members 18 and conductive cross members 20 shorten to improve the productivity of the liquid crystal cells 10.

In the above embodiment, the liquid crystal cell assembly 1 is separated into the liquid crystal cells 10 by the method shown in FIGS. 7A to 7C. Alternatively, the liquid crystal cell assembly 1 may be separated into the liquid crystal cells 10 by, e.g., cutting apart the first and second substrate members 2 and 3 by hydraulic cutting along the segmentation lines 111a, 111b, 112a, and 112b, and segmenting the common sides 18a of the frame-like seal members 18 along the segmentation lines 111a and 111b. In this case, the first and second substrate members 2 and 3 may be glass plates thicker than those of the above embodiment.

Figure 9:
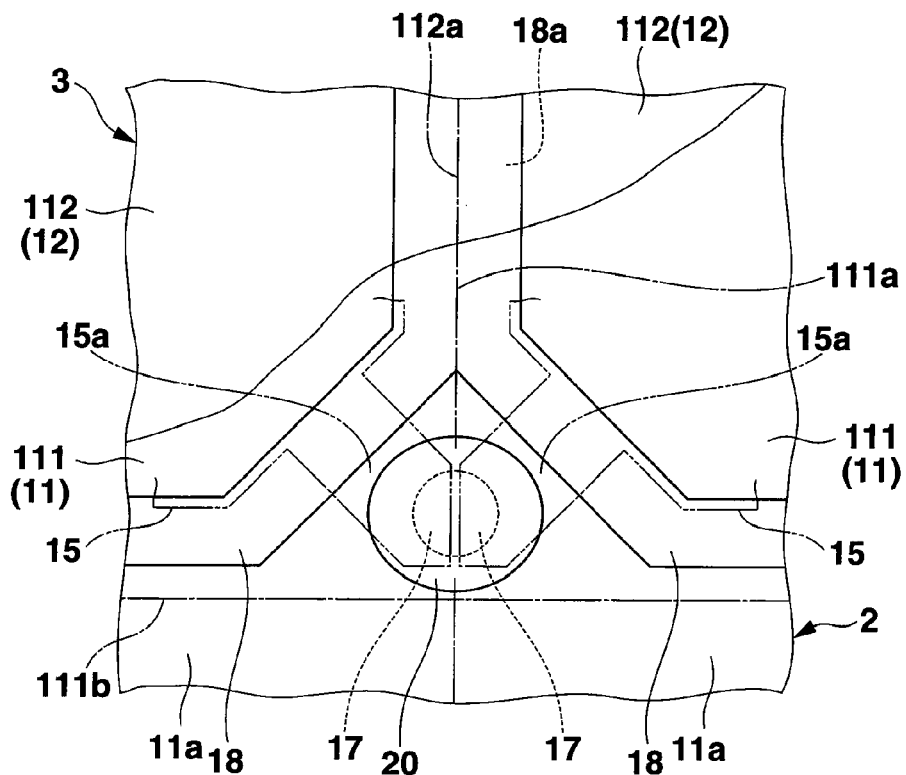
FIG. 9 is a partial enlarged view of a liquid crystal cell according to the second embodiment of the present invention.

FIG. 9 is a partial enlarged view of a liquid crystal cell assembly according to the second embodiment of the present invention.

According to the liquid crystal cell assembly of this embodiment, one cross electrode 17 corresponding to one of two cross connecting portions 15a which are adjacent through a segmentation line 112a of second substrate regions 112 of a second substrate member 3, and the other cross electrode 17 corresponding to the remaining cross connecting portion 15a are formed of a continuous metal film which strides across the segmentation line 111a. The cross electrodes 17 are segmented along the segmentation line 112a when separating the liquid crystal cell assembly 1. Except for this, the arrangement of the liquid crystal cell assembly 1 of the second embodiment is the same as that of the liquid crystal cell assembly 1 of the first embodiment described above.

In the liquid crystal cell assembly of the second embodiment, one cross electrode 17 corresponding to one of the two cross connecting portions 15a which are adjacent through the segmentation line 111a, and the other cross electrode 17 corresponding to the remaining cross connecting portion 15a are formed of the continuous metal film. This simplifies the shapes of the frame-like seal members 18, conductive cross members 20, and cross electrodes 17, and facilitates formation of the cross electrodes 17.

Figure 10:
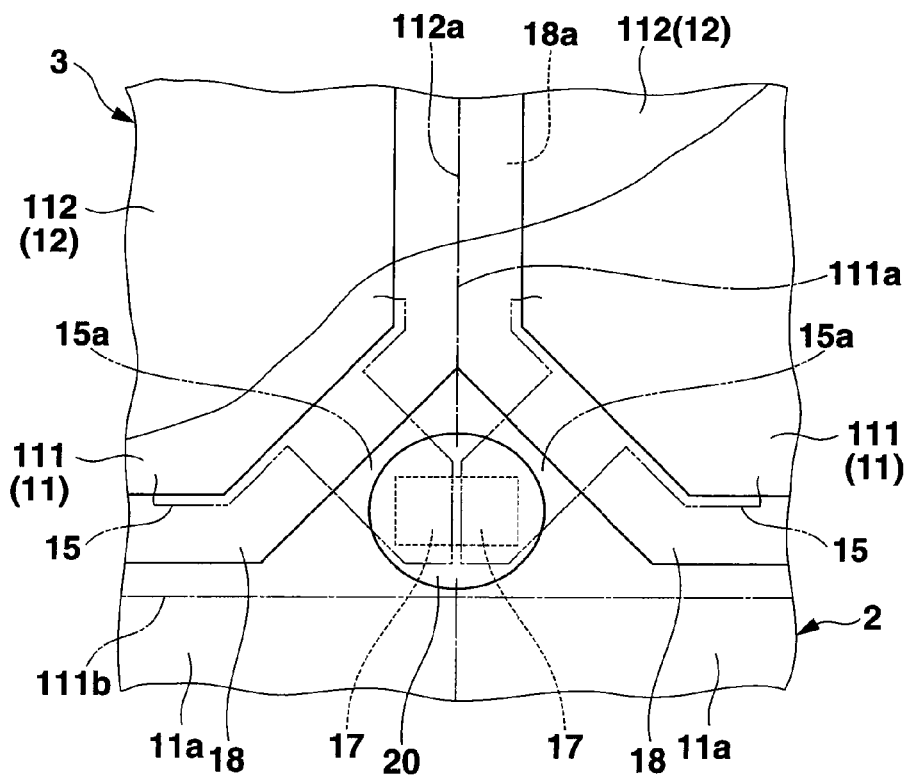
FIG. 10 is a partial enlarged view of a liquid crystal cell according to a modification of the second embodiment.

In the second embodiment shown in FIG. 9, the two cross electrodes 17 corresponding to the cross connecting portions 15a which are adjacent through the segmentation line 111a are formed of the circular metal film having a center on the segmentation line 111a. The metal film is not limited to a circular one, but may have a rectangular shape which is axisymmetric about the segmentation line 111a, as in the modification of the second embodiment shown in FIG. 10.

As described above, a liquid crystal cell assembly according to the present invention comprises a first substrate member on which at least first electrodes are formed on each of cell regions which respectively correspond to liquid crystal cells and are arranged to be adjacent to each other, a second substrate member on which at least a second electrode opposing the first electrodes is formed on each of the cell regions of the first substrate member, and frame-like seal members which are arranged between the first and second substrate members, include common sides each formed by continuously linking at least two adjacent sides, are formed into frames that respectively define the cell regions, and bond the first and second substrate members.

In the liquid crystal cell assembly, preferably, each of the common sides is formed to stride across a boundary between adjacent cell regions and has a width wider than those of remaining sides. Preferably, the cell regions comprise screen areas respectively surrounded by the frame-like seal members, and terminal array portions which are located outside the screen areas and on each of which a terminal electrode connecting to at least one of the first and second electrodes is arranged, and the common sides are formed by the frame-like seal members of the adjacent cell regions excluding portions corresponding to the terminal array portions. Preferably, the cell regions form rectangles each including three boundaries along an outer shape of one frame-like seal member and a boundary where the terminal of a terminal array portion is arranged, and in each frame-like seal member, a side which is formed along at least one of the three boundaries of each cell region excluding the boundary where the terminal of the terminal array portion is arranged forms a common side together with a corresponding side of the frame-like seal member of an adjacent cell region.

In the liquid crystal cell assembly, preferably, in each frame-like seal member, two sides which are formed along, of three boundaries of each cell region excluding a boundary where a terminal of a terminal array portion is arranged, two boundaries which oppose each other through the boundary where the terminal is arranged form common sides together with corresponding sides of the frame-like seal members of adjacent cell regions. Preferably, in each frame-like seal member, a filling hole to fill liquid crystals is formed in a side of each cell region along a boundary which opposes a boundary where a terminal of a terminal array portion is arranged, and two sides which are formed along boundaries excluding the boundary where the terminal is arranged and a boundary that opposes the boundary where the terminal is arranged form common sides together with corresponding sides of the frame-like seal members of adjacent cell regions.

In the liquid crystal cell assembly, preferably, cross electrodes are formed on the first substrate member at positions of the adjacent cell regions which are outside the frame-like seal members and are close to each other through boundaries of the adjacent cell regions, cross connecting portions connected to the second electrode are formed every adjacent cell regions on the second substrate member at positions of the adjacent cell regions which are outside the frame-like seal members, are close to each other through the boundaries of the adjacent cell regions, and correspond to the cross electrodes formed on the first substrate member, and common cross members are integrally formed, between the first and second substrate members at positions where the cross electrodes and the cross connecting portions of the adjacent cell regions oppose, to stride across the boundaries of the adjacent cell regions, and are arranged to electrically connect the cross electrodes and the cross connecting portions of the respective cell regions. In this case, desirably, at least one of each of the cross electrodes and a corresponding one of the cross connecting portions formed on the adjacent cell regions of the first and second substrate members is formed of a conductive film which is continuous to stride across a boundary of two adjacent cell regions. Desirably, at least one of each of the cross electrodes and a corresponding one of the cross connecting portions is formed to be symmetric about a boundary of two adjacent cell regions.

A liquid crystal cell manufacturing method according to the present invention comprises a first step of forming a first substrate member on which at least first electrodes are respectively formed on cell regions which respectively correspond to liquid crystal cells and are arranged to be adjacent to each other, a second step of forming a second substrate member on which at least a second electrode opposing the first electrodes is formed on each of the cell regions of the first substrate member, a third step of forming frame-like seal members on at least one of the surface of the first substrate member where the first electrodes are formed and the surface of the second substrate member where the second electrode is formed, which define the surface into the cell regions, such that the frame-like seal members are continuous through common sides each of which is formed by linking at least one side of each of the adjacent cell regions, a fourth step of forming a cell assembly by adhering the first and second substrate members such that surfaces of the first and second substrate members where the respective electrodes are formed oppose each other, and a fifth step of separating the cell assembly into individual liquid crystal cells by segmenting the first substrate member, the second substrate member, and the seal members for the respective cell regions along perimeters of the cell regions defined by the seal members and along a segmentation line provided on the frame-like seal members which form the common sides of the adjacent cell regions.

In the liquid crystal cell manufacturing method, preferably, the first step includes a step of forming, in the respective cell regions of the first substrate member, screen areas respectively surrounded by the frame-like seal members, and terminal array portions which are located outside the screen areas and on each of which terminal electrodes connecting to at least the first electrodes are arranged, and the third step includes a step of forming common sides, which share the frame-like seal members of the adjacent cell regions, at the frame-like seal members excluding portions corresponding to the terminal array portions of the adjacent cell regions. Preferably, the third step includes a step of forming common sides, together with corresponding sides of the frame-like seal members of the adjacent cell regions, on two sides which are formed along, of three boundaries of each cell region excluding a boundary where terminals of a terminal array portion are arranged, two boundaries which oppose each other through the boundary where the terminals are arranged. Preferably, the third step includes a step of forming the frame-like seal members each of which comprises a side, having a filling hole to fill liquid crystals, extending along a boundary which opposes a boundary of each cell region where terminals of a terminal array portion are arranged, a side extending along the boundary where the terminals are arranged, and common sides, which are formed with respect to the adjacent cell regions along remaining boundaries excluding the boundary where the terminals of the terminal array portion are arranged, and the opposing boundary. Preferably, the third step includes a step of forming the frame-like seal members on at least one of the surface of the first substrate member where the first electrodes are formed and the surface of the second substrate member where the second electrode is formed, by coating of a seal material with a dispenser.

In the liquid crystal cell manufacturing method, preferably, the first step includes a step of forming, for the respective adjacent cell regions of the surface of the first substrate member where the first electrodes are formed, first connection terminals extending to positions which are outside the regions surrounded by the frame-like seal members and which are adjacent to each other through segmentation lines on the common sides of the frame-like seal members of the adjacent cell regions, the first connection terminals being connected to at least the first electrodes, the second step includes a step of forming, for the respective adjacent cell regions of the surface of the second substrate member where the second electrode is formed, second connection terminals, at positions which are adjacent to each other through the segmentation lines in the respective adjacent cell regions, to oppose the first connection terminals, the third step further includes a step of forming, on two connection terminals including one of two first connection terminals and two second connection terminals, which are arranged to be adjacent to each other through the segmentation lines, a common conductive cross member by coating, to electrically connect the first connection terminals and the second connection terminals, and the fifth step includes a step of segmenting the cross member, formed between the two first connection terminals and the two second connection terminals which are adjacent to each other through the segmentation lines of the adjacent cell regions, into the cell regions along the segmentation lines. In this case, desirably, the first step includes a step of forming the first connection terminals from a conductive film which is continuous to stride across a boundary of the two adjacent cell regions. Desirably, the first step includes a step of forming the first connection terminals to be axi-symmetric about a boundary of the two adjacent cell regions. Desirably, the third step includes a step of forming the cross member by coating with a dispenser on at least one of the surface of the first substrate member where the first electrodes are formed and the surface of the second substrate member where the second electrode is formed.

A liquid crystal cell manufacturing method according to the present invention comprises a first step of forming first electrodes which define a screen area which displays an image of one liquid crystal cell, and terminal electrodes to form a terminal array portion where terminals respectively connecting to the first electrodes are arranged continuously in two perpendicular directions, for respective first substrate regions each of which corresponds to one liquid crystal cell, on a plate surface of a first substrate member including an area that provides liquid crystal cell substrates, a second step of forming a second electrode, which opposes the first electrodes formed on the first substrate member, for respective second substrate regions each of which corresponds to one liquid crystal cell, the second electrode being arranged on a plate surface of a second substrate member including an area that provides liquid crystal cell substrates so as to correspond to the screen area of the first substrate regions, a third step of forming a frame-like seal member, on at least one of the first and second substrate members, into a shape which includes a common side formed to stride across a boundary of adjacent substrate regions on one of the first substrate regions and the second substrate regions, and remaining sides that surround the screen area, the seal member being continuous across the substrate regions, a fourth step of arranging the first and second substrate members such that the second substrate regions oppose the screen area of the first substrate regions, and bonding the first and second substrate members through the frame-like seal member, and a fifth step of segmenting the first and second substrate members that are bonded, along segmentation lines on boundaries of the first substrate regions and the second substrate regions simultaneously with the common side which is formed to stride across the boundary of the adjacent substrate regions.

In the liquid crystal cell manufacturing method, preferably, the first step includes a step of forming, for the respective adjacent cell regions on the surface of the first substrate member where the first electrodes are formed, first connection terminals extending to positions which are outside the regions surrounded by the frame-like seal members and which are adjacent to each other through segmentation lines of the adjacent cell regions, the first connection terminals being connected to the first electrodes, the second step includes a step of forming, for the respective adjacent cell regions on the surface of the second substrate member where the second electrode is formed, second connection terminals, at positions which are adjacent to each other through the segmentation lines, to oppose the first connection terminals, the third step further includes a step of forming a common conductive cross member by coating to electrically connect the first connection terminals and the second connection terminals, to correspond to two connection terminals including one of two first connection terminals and two second connection terminals which are arranged to be adjacent to each other through the segmentation lines, and the fifth step includes a step of segmenting the cross member, formed between the two first connection terminals and the two second connection terminals which are adjacent to each other through the segmentation lines of the adjacent cell regions, into the substrate regions along the segmentation lines.

The liquid crystal cell manufacturing method and liquid crystal cell assembly according to the present invention are not limited to the active matrix liquid crystal cell described above, but may be applied to the manufacture of a simple matrix liquid crystal cell or a different liquid crystal cell, and an assemble of such liquid crystal cells. In the simple matrix liquid crystal cell, scanning electrodes (first electrodes) extending in the direction of row are formed on the inner surface of the first substrate. Signal electrodes (second electrodes) extending in the direction of column are formed on the inner surface of the second substrate. In the different liquid crystal cell, segment electrodes (first electrodes) having shapes corresponding to the display pattern are formed on the inner surface of the first substrate. At least one common electrode (second electrode) opposing the segment electrodes is formed on the inner surface of the second substrate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal cell assembly comprising:
a first substrate;
seal members, each shaped like a frame in a cell region corresponding to one liquid crystal cell and having a liquid crystal injection port formed at a side of the frame; and
a second substrate opposing the first substrate and bonded to the first substrate by the seal members,
wherein the seal members are arranged such that openings of the liquid crystal injection ports are directed in a column direction, and such that two cell regions adjacent in a row direction commonly have a linear side corresponding to a boundary between the two cell regions, wherein the linear side is connected to the side at which the liquid crystal injection port is formed through a side that makes an inclined angle with the linear side, and wherein a side that opposes the side at which the liquid crystal injection port is formed is linear, perpendicular to the linear side, and directly connected to the linear side.

2. A liquid crystal cell assembly according to claim 1, wherein the side that opposes the side at which the liquid crystal injection port is formed has a length that is shorter than a length of the linear side.

3. A liquid crystal cell assembly according to claim 1, wherein each of the first and second substrates has electrodes respectively for cell regions.

4. A liquid crystal cell assembly comprising:
a first substrate;
first and second seal members, each shaped like a frame corresponding to one liquid crystal cell, the first and second seal members being adjacent in a row direction to commonly have a first frame region that is linear; and
a second substrate opposing the first substrate and bonded to the first substrate by the first and second seal members,
wherein each of the first and second seal members includes:
a second frame region in which a liquid crystal injection port is opened so as to be directed in a column direction;
a third frame region which makes an inclined angle with the first frame region and connects the first frame region and the second frame region; and
a fourth frame region which opposes the second frame region and which is linear, perpendicular to the first frame region, and directly connected to the first frame region.

5. A liquid crystal cell assembly according to claim 4, wherein the fourth frame region has a length that is shorter than a length of the first frame region.

6. A liquid crystal cell assembly according to claim 4, wherein the first frame region has a seal width that is wider than a seal width of the fourth frame region.

7. A liquid crystal cell assembly according to claim 4, wherein the first seal member and the second seal member have symmetric shapes.

* * * * *